United States Patent
Pauly

[15] 3,668,806
[45] June 13, 1972

[54] AXLE MOUNTING FOR TOY VEHICLES

[72] Inventor: Ronald R. Pauly, Mound, Minn.

[73] Assignee: Tonka Corporation, Mound, Minn.

[22] Filed: April 5, 1971

[21] Appl. No.: 130,896

[52] U.S. Cl. .................................................46/201, 46/221
[51] Int. Cl. ........................................................A63h 17/26
[58] Field of Search ................................46/201, 202, 221

[56] References Cited

UNITED STATES PATENTS 3,063,194   11/1962   Berguerand ............................46/221
3,482,351   12/1969   Rix et al. ................................46/201

Primary Examiner—Louis G. Mancene
Assistant Examiner—Robert F. Cutting
Attorney—Carlsen, Carlsen & Sturm

[57] ABSTRACT

An axle mounting for a toy vehicle wherein the vehicle chassis has side walls provided with transversely aligned upwardly opening notches having their lower closed ends offset longitudinally of the chassis from the open ends, an axle disposed transversely across the chassis with its end portions seated in the lower ends of the notches, and a body member seated downwardly on the chassis and having rigid projections depending vertically in alignment with the open ends of the notches and into the horizontal plane thereof to engage and retain the axle in seated position.

3 Claims, 5 Drawing Figures

PATENTED JUN 13 1972

INVENTOR
RONALD R. PAULY

BY
Carlsen, Carlsen & Sturm
ATTORNEYS

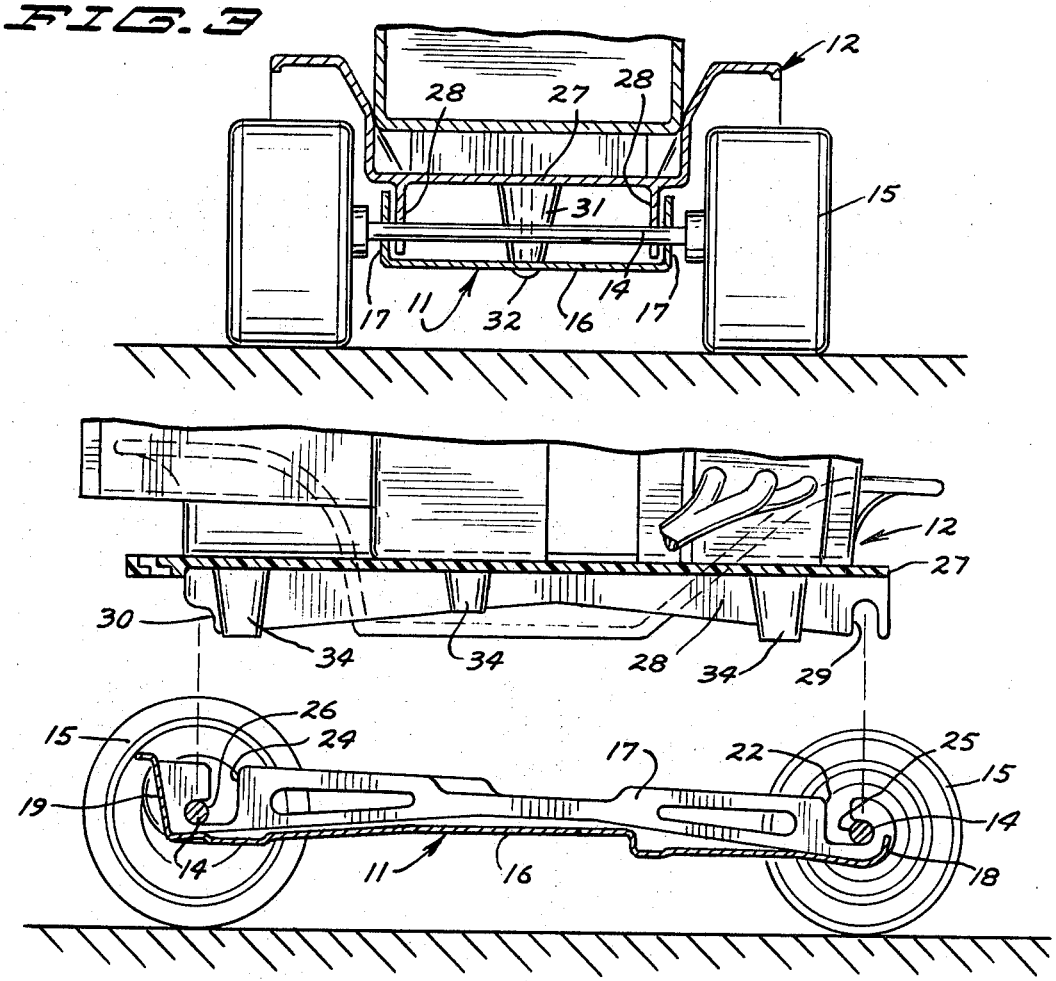
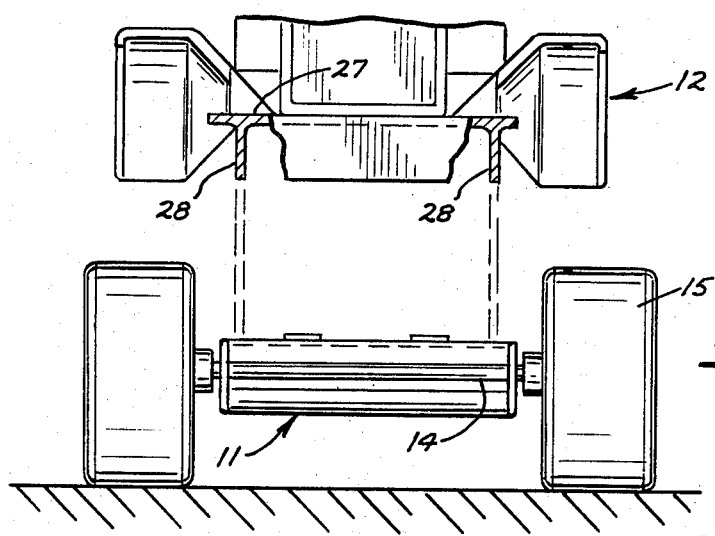
INVENTOR
RONALD R. PAULY

3,668,806

AXLE MOUNTING FOR TOY VEHICLES

CROSS REFERENCE TO RELATED APPLICATION

This application is closely related to application for U.S. Pat. Ser. No. 879,714, filed Nov. 25, 1969, now U.S. Pat. No. 3,599,366 by Ronald R. Pauly and Thomas W. Good, which is also entitled Axle Mounting for Toy Vehicles.

BACKGROUND OF THE INVENTION

This invention relates generally to an improved means of mounting wheel axles on toy vehicles in such a way as to eliminate certain steps in manufacturing and thus reduce the cost thereof.

In the assembly of toy vehicles the mounting of the wheels on the vehicle is one relatively time-consuming and expensive step. Conventionally this has been accomplished by inserting the axle through apertures provided in the side walls of the chassis and then mounting the wheels on the ends of the axle. In an alternate method the wheels are preassembled with the axle and the axle is dropped into slots in the chassis after which tabs of metal adjoining the slots are bent over to close the slots and hold the axle therein. It is desirable from a manufacturing standpoint that the wheels and axle be preassembled before mounting on the vehicle and the latter of the above methods of course permits this. However, it does not require the tab bending step and tabs provide undesirable exposed metal edges.

It is desirable that an axle mounting be provided which allows preassembly of the wheels and axle and wherein the mounting of the assembly is accomplished merely by mounting the vehicle body upon the chassis without requiring a specific axle mounting step.

The structure disclosed in the aforementioned patent application is the closest prior art known in that it does provide axle receiving slots in the chassis which are closed by portions of the body to hold the axle therein when the body and chassis are assembled. However, it is found that on certain types of vehicles, such as where the chassis is very shallow vertically, the structure is not satisfactory.

SUMMARY OF THE INVENTION

It is accordingly an object of this invention to provide an improved means of mounting an axle on a toy vehicle having a shallow pan chassis and wherein the axle is locked in position by assembly of the body and chassis.

Another object of the invention is to provide a toy vehicle construction where the vehicle axle is locked in position by assembly of the vehicle body and chassis and wherein this can be accomplished without providing any openings in the bottom of the chassis.

With these and other objects in view the invention broadly comprises an upwardly opening pan-shaped chassis having one or more pairs of transversely aligned upwardly opening slots in the side walls thereof, said slots having their lower ends offset longitudinally of the chassis from their open upper ends, an axle extending transversely of the chassis between and through each pair of notches with the end portions of the axle seated in the lower offset portions of the notches, and a body member fitting downwardly within the chassis and having a blocking portion projecting downwardly to and in transverse alignment with the open ends of the notches to retain the axle in seated position.

BRIEF DESCRIPTION OF THE DRAWINGS

In the drawings:

FIG. 3 is a transverse vertical section through the vehicle chassis taken on line 3—3 of FIG. 1.

FIG. 4 is an exploded view prior to assembly of the chassis and body members and with the chassis and a portion of the body member being shown in longitudinal vertical section.

FIG. 5 is an exploded end view of the body and chassis in preassembly condition with portions of the body broken away to show the axle retention portions thereof.

DESCRIPTION OF THE PREFERRED EMBODIMENT

Figure 1:
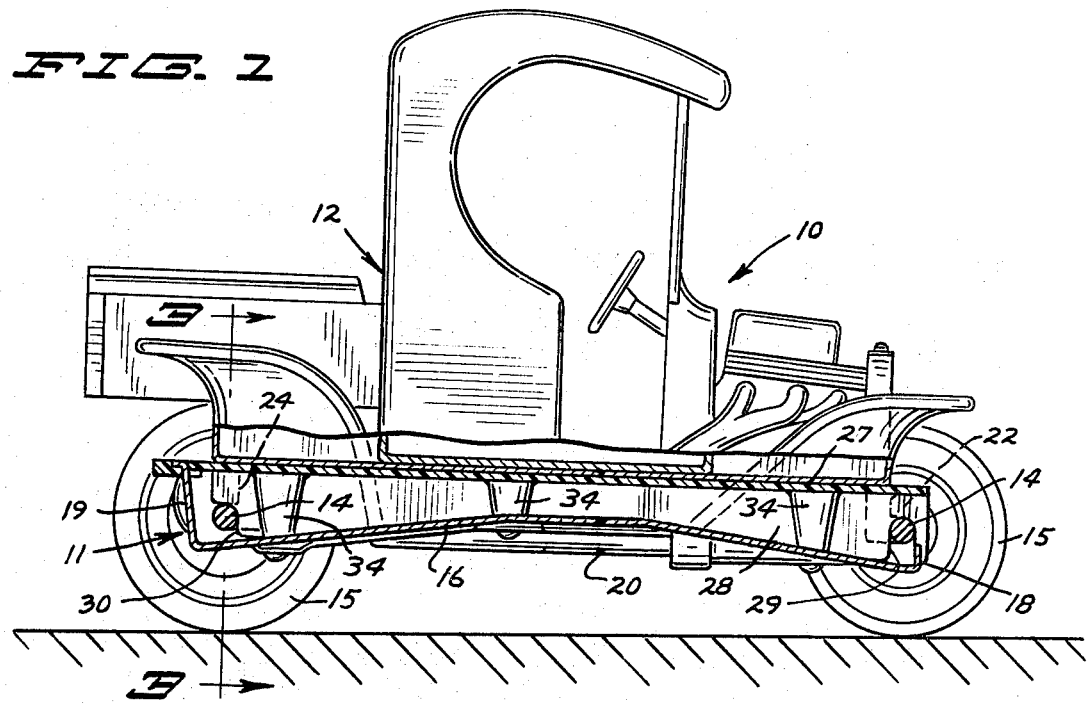
FIG. 1 is a side elevation of a toy vehicle embodying the axle construction with the lower chassis portion of the vehicle shown in longitudinal vertical section to show the axle mounting.
Figure 2:
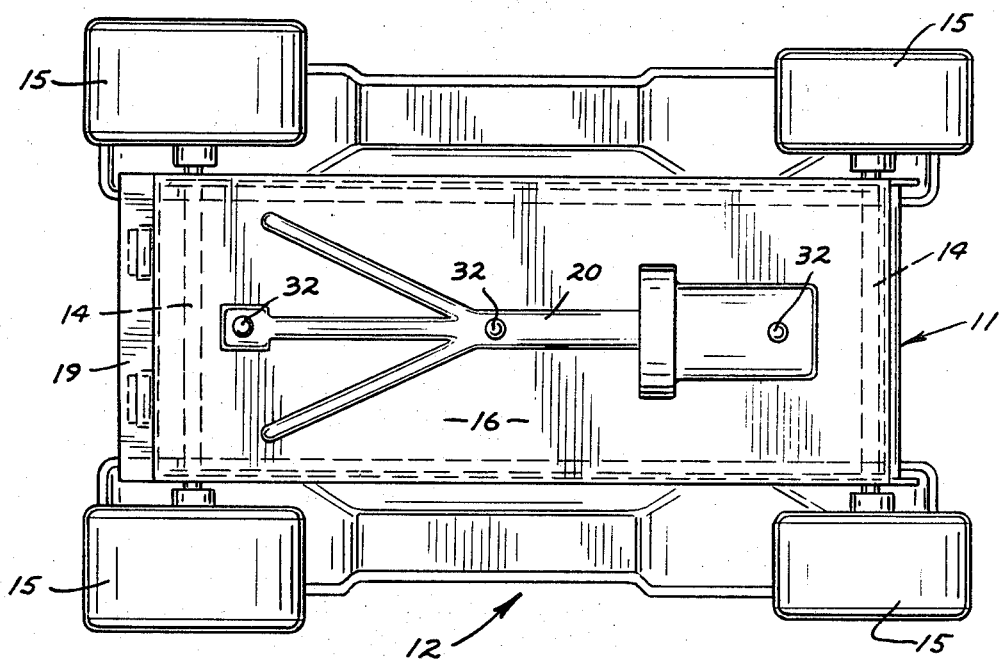
FIG. 2 is a bottom plan view of the vehicle.

Referring now more particularly to the drawings reference numerals will be used to denote like parts or structural features in the different views. The toy vehicle denoted generally at 10 includes a chassis 11, a body 12 and one or more wheel and axle assemblies each comprising an axle 14 having a wheel 15 mounted at each end.

The chassis 11 is preferably formed of sheet metal material and has a shallow upwardly opening pan configuration with an imperforate generally rectangular bottom wall 16, parallel side walls 17 and front and rear end walls denoted at 18 and 19, respectively. Bottom wall 16 may be stamped to simulate a muffler and exhaust system 20. The side walls 17 may also be configured as desired, such as shown in FIG. 4, to simulate the lower portion of a full sized vehicle.

Walls 17 are also provided with front and rear pairs of transversely aligned notches denoted at 22 and 24, respectively. These notches open through the upper edges of walls 17 and are L-shaped. Preferably notches 22 have their lower closed ends offset forwardly as at 25 and notches 24 have their lower closed ends offset rearwardly as at 26 (FIG. 4) to form axle seats.

Body 12 may be given any desired configuration and has a flat base plate 27 of such a size and shape as to cover the top of the chassis 11. A pair of elongated flanges 28 extend longitudinally along the underside of plate 27 in transversely spaced parallelism. These flanges are spaced so as to just fit within the chassis side walls 17 as shown in FIGS. 3 and 5 and the lower edges thereof are shaped to conform to the contour of chassis bottom wall 16 as shown in FIG. 1. The front end portion of each flange 28 is provided with a forwardly facing shoulder 29 which may be the rear wall of a downwardly opening notch and the rear end portion of each flange is provided with a rearwardly facing shoulder 30. The distance between shoulders 29 and 30 on each flange is substantially equal to the distance between the remote sides of the open ends of the notches 22 and 24 in each chassis side wall 17.

In assembling the vehicle wheel and axle assemblies are dropped into each pair of notches 22 and 24 and the axles moved into the closed ends or axle seats 25 and 26 as shown in FIG. 4. Body 12 is then lowered onto the chassis and shoulders 29 and 30 respectively engage against the front and rear axles and provide blocking portions preventing upward removal of the axles from the slots. The chassis is then secured to the body by means of rivets or screws 32 which extend upwardly into anchor posts 34 depending from plate 27 between the flanges 28.

By having slots 22 and 24 open upwardly from walls 17 two major advantages are provided. First the chassis or pan 11 can be made very shallow with the imperforate continuous side wall 16 providing the necessary longitudinal rigidity. Secondly, the continuous wall 17 provides a smooth undersurface for the toy.

The construction allows preassembly of the wheels and axle and rapid assembly of the toy. It accordingly economically and effectively carries out the aforementioned objectives.

Having now therefore fully illustrated and described the invention, what I claim to be new and desire to protect by United States Letters Patent is:

1. In a toy vehicle, a chassis member having a pair of transversely spaced longitudinally extending side walls, said walls having transversely aligned notches extending downwardly from the upper edges of the walls with the lower ends of such notches offset longitudinally from the upper open ends thereof, a wheel axle seated in said lower offset ends of said notches, and a body member having a vertical interfitting relationship with the chassis member and secured thereto and having integral blocking portions on its underside positioned so that as it is lowered into said relationship said blocking portions will close said notches and retain the axle in the lower ends thereof.

2. The subject matter of claim 1 wherein said walls have two pairs of said transversely aligned notches for the reception of two parallel axles spaced longitudinally of the chassis and said body member having longitudinally spaced blocking portions closing both pairs of notches.

3. The subject matter of claim 2 wherein the lower ends of said pairs of notches are offset in a direction away from each other.

* * * * *